US012558974B2

(12) United States Patent
Ruffels et al.

(10) Patent No.: US 12,558,974 B2
(45) Date of Patent: Feb. 24, 2026

(54) DISCONNECTION ASSEMBLY FOR TETHERED ELECTRIC VEHICLE

(71) Applicant: Caterpillar SARL, Geneva (CH)

(72) Inventors: Maxim Rhys Ruffels, Thurlaston (GB); Richard Strong, Bishops Lydeard (GB); Simon Conway, Leamington Spa (GB)

(73) Assignee: Caterpillar SARL, Geneva (CH)

( * ) Notice: Subject to any disclaimer, the term of this patent is extended or adjusted under 35 U.S.C. 154(b) by 833 days.

(21) Appl. No.: 17/799,482

(22) PCT Filed: Jan. 29, 2021

(86) PCT No.: PCT/EP2021/025037
§ 371 (c)(1),
(2) Date: Aug. 12, 2022

(87) PCT Pub. No.: WO2021/160341
PCT Pub. Date: Aug. 19, 2021

(65) Prior Publication Data
US 2023/0074416 A1     Mar. 9, 2023

(30) Foreign Application Priority Data
Feb. 12, 2020     (GB) ...................................... 2001935

(51) Int. Cl.
B60L 50/53          (2019.01)
B60L 53/18          (2019.01)
(Continued)

(52) U.S. Cl.
CPC .............. B60L 50/53 (2019.02); B60L 53/18 (2019.02); H01H 3/0226 (2013.01); H01H 3/16 (2013.01);
(Continued)

(58) Field of Classification Search
CPC ...... B60L 50/53; B60L 53/18; B60L 2200/40; H01H 3/0226; H01H 3/16; H01H 9/28; H01H 27/00; H02J 2310/48
(Continued)

(56) References Cited

U.S. PATENT DOCUMENTS

| | | | |
|---|---|---|---|
| 3,060,763 A | 10/1962 | Neufeld et al. | |
| 3,632,906 A | 1/1972 | Aihara | |

(Continued)

FOREIGN PATENT DOCUMENTS

| | | | | |
|---|---|---|---|---|
| CN | 102897053 | 6/2015 | | |
| CN | 106480925 A | * 3/2017 | ............ | E02F 9/2095 |

(Continued)

OTHER PUBLICATIONS

India First Examination Report for Indian Patent Appln. No. 17/799482, mailed Nov. 8, 2023 (6 pgs).

(Continued)

*Primary Examiner* — S. Joseph Morano
*Assistant Examiner* — Heaven R Buffington

(57) ABSTRACT

An electric vehicle is supplied with power from a power supply via a cable suspended from an anchor. The anchor is attached to a mount on the vehicle and detachable from the mount by tension in the first portion of the cable between the anchor and the power supply. A second portion of the cable between the anchor and the vehicle remains slack in the attached position of the anchor, and extends on detachment of the anchor to relieve tension in the first portion of the cable. A disconnection switch is operable by detachment of the anchor to interrupt the power supply from the cable to the vehicle.

10 Claims, 5 Drawing Sheets

(51) Int. Cl.

| | |
|---|---|
| *H01H 3/02* | (2006.01) |
| *H01H 3/16* | (2006.01) |
| *H01H 9/28* | (2006.01) |
| *H01H 27/00* | (2006.01) |

(52) U.S. Cl.
CPC ............. *H01H 9/28* (2013.01); *H01H 27/00* (2013.01); *B60L 2200/40* (2013.01); *H02J 2310/48* (2020.01)

(58) Field of Classification Search
USPC .............................. 191/12 R, 12.2 R, 12.2 A
See application file for complete search history.

(56) References Cited

U.S. PATENT DOCUMENTS

| | | | | | |
|---|---|---|---|---|---|
| 3,760,134 | A | * | 9/1973 | McCray | ................. H01H 27/00 340/687 |
| 5,319,292 | A | * | 6/1994 | Backstrand | ............. B66C 13/30 303/3 |
| 8,168,923 | B2 | | 5/2012 | Wong et al. | |
| 9,172,232 | B2 | | 10/2015 | Kinomura | |
| 2007/0096538 | A1 | | 5/2007 | Niemi et al. | |
| 2013/0192944 | A1 | | 8/2013 | Zimmerman | |

FOREIGN PATENT DOCUMENTS

| | | | | |
|---|---|---|---|---|
| CN | 105858364 | B | 1/2018 | |
| CN | 106364334 | B | 3/2019 | |
| DE | 3312221 | A1 | 10/1984 | |
| JP | 2008190231 | A | 8/2008 | |
| JP | 2017014687 | A | 1/2017 | |
| JP | 2018017011 | A | 2/2018 | |
| JP | 2018184783 | A | 11/2018 | |
| KR | 200429497 | Y1 | 10/2006 | |
| WO | 2014131826 | | 9/2014 | |
| WO | WO-2014131826 | A1 * | 9/2014 | ........... B66C 19/007 |
| WO | 2016185346 | A1 | 11/2016 | |

OTHER PUBLICATIONS

International Search Report related to Application No. PCT/EP2021/025037; reported on May 7, 2021.
Great Britain Search Report related to Application No. GB2001935.2 reported on Jul. 29, 2020.

* cited by examiner

DISCONNECTION ASSEMBLY FOR TETHERED ELECTRIC VEHICLE

CROSS-REFERENCE TO RELATED APPLICATION

This Application is a 35 USC 0 371 U.S. National Stage filing of International Application No. PCT/EP2021/025037 filed on Jan. 29, 2021, which claims the benefit and priority of Great Britain Application No. 2001935.2 filed on Feb. 12, 2020.

TECHNICAL FIELD

This disclosure relates to vehicles which are powered in normal operation from an external electrical supply point via a power cable, which attaches the machine to the supply point.

BACKGROUND

This arrangement is used for example to supply power to excavators and other work machines. In operation, the cable or tether may be placed under tension if the machine moves too far from the power supply point or if the cable becomes tangled in moving parts of the machine.

To address this problem it is known to monitor the tension in the cable, or to disconnect the power supply so that the machine is brought to a stop when the cable is stretched.

For example, CN 106480925A discloses an electric excavator with a swivelling tether support arm. A power cable is plugged into a socket on the arm, and supported at a short distance from the arm by an elastic strain reliever attached to the arm. A slack portion of the cable extends alongside the elastic strain reliever, which relieves the plug and socket connection from tension in the cable. A tension sensor is arranged to monitor the connection by sensing tension in the elastic strain reliever.

CN 106364334A discloses a power supply vehicle which supplies power to a moving machine via a retractable cable. The cable is connected to a cable disconnection device mounted on a swivelling arm attached to the machine. The cable disconnection device disconnects the cable when a tension sensor detects excessive tension in the cable. The cable may terminate at a plug which is received in a socket on the rotating arm and retained by a brittle pin which allows the plug to detach from the socket under excessive tension. The power supply vehicle automatically turns off the power supply to the cable when the cable is disconnected from the machine.

In any practical system, it is desirable to ensure that the power supply is not interrupted by nuisance operation of the safety mechanism. For example, where a considerable length of power cable is suspended to form a catenary curve, the cable forms an elastic system, and its weight may cause intermittent operation of the safety mechanism if set in oscillation by a sudden movement of the machine.

With practice, an operator may choose to operate the machine in such conditions close to the limit of the cable. It would be useful to discourage such operator behaviour in order to avoid fatiguing the cable and power connectors.

A plug and socket connection may be configured to detach under excess load while resisting nuisance operation. However, damaging arcing may occur at the contacts on detachment of the plug, while the detached plug could be hazardous, for example, if it falls into water while the conductor is live. Moreover, connective parts that are configured to pass high currents require a substantial mechanical joint which may resist disconnection, especially if the disconnection force is not exactly aligned with the connection axis. In such situations, a suddenly applied tension force could damage the cable before disconnection occurs.

Once the power supply is interrupted the machine will undergo some residual motion before it comes to rest. It would be desirable to ensure that the residual motion of the machine cannot further strain the cable to breaking point, in the event that the cable should become entangled in parts that undergo substantial residual motion due to a large momentum—for example, if the machine happens to be operating with a fully loaded bucket at the end of a fully extended boom and stick.

SUMMARY OF THE DISCLOSURE

In a first aspect, the disclosure provides an assembly for supplying power to a vehicle.

The assembly includes a power cable having a first end connectable to an electric power supply, and a second end connectable to a vehicle to supply electric power from the power supply to the vehicle; and a disconnection switch, operable to interrupt the supply of electric power from the cable to the vehicle.

The assembly further includes an anchor, connected to the cable between its first and second ends, to define a first portion of the cable extending between the anchor and the first end of the cable, and a second portion of the cable extending between the anchor and the second end of the cable; and a mount configured to be supported on the vehicle in a use position.

In the use position of the mount, when the second end of the cable is connected to the vehicle, the anchor is detachably attachable and re-attachable to the mount, to support the cable on the mount with the second portion of the cable in a slack condition.

The anchor is detachable from the mount by application of a threshold detachment force by tension in the first portion of the cable, and the disconnection switch is operable by detachment of the anchor from the mount to interrupt the supply of electric power.

In a related aspect, the disclosure provides a vehicle including the assembly, wherein the second end of the cable is connected to the vehicle and the mount is supported on the vehicle in the use position.

In another aspect, the disclosure provides a method of supplying electric power to a vehicle, including: providing a power cable; arranging a first end of the cable to be connectable to an electric power supply, and a second end of the cable to be connectable to the vehicle to supply electric power from the power supply to the vehicle; and arranging a disconnection switch to be operable to interrupt the supply of electric power from the cable to the vehicle.

The method further includes: connecting an anchor to the cable between its first and second ends, to define a first portion of the cable extending between the anchor and the first end of the cable, and a second portion of the cable extending between the anchor and the second end of the cable; and supporting a mount on the vehicle in a use position, wherein the anchor is detachably attachable and re-attachable to the mount, to support the cable on the mount with the second portion of the cable in a slack condition.

The method further includes: arranging the anchor to be detachable from the mount by application of a threshold detachment force by tension in the first portion of the cable;

and arranging the disconnection switch to be operable by detachment of the anchor from the mount to interrupt the supply of electric power.

BRIEF DESCRIPTION OF THE DRAWINGS

Further features and advantages will be evident from the following illustrative embodiment which will now be described, purely by way of example and without limitation to the scope of the claims, and with reference to the accompanying drawings, in which:

DETAILED DESCRIPTION

Figures 1, 2, 3:
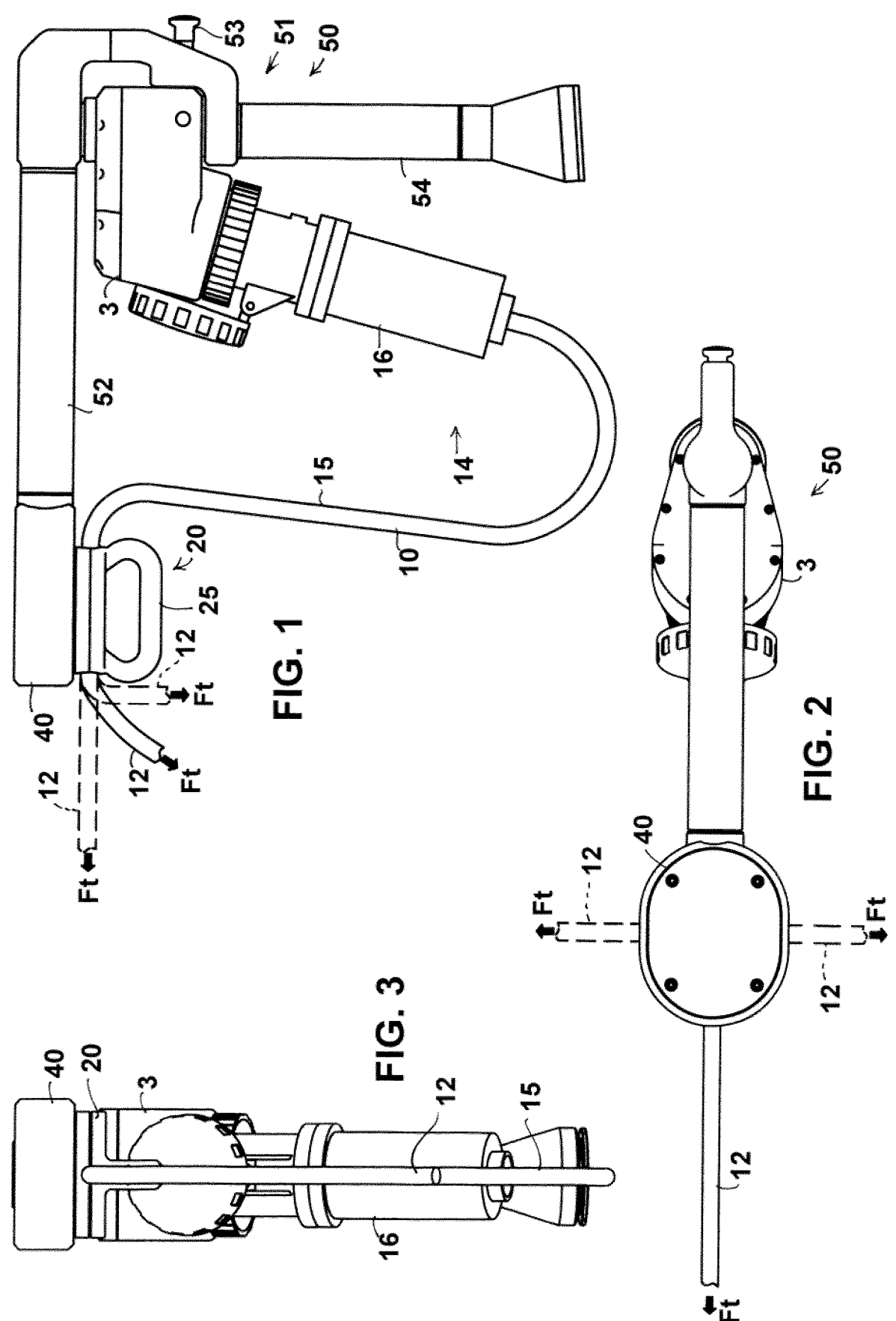
FIG. 1 shows an assembly in accordance with a first embodiment of the disclosure, including a mount supported in its use position on a support structure, and an anchor attached to the mount.
FIG. 2 is a top view of the assembly.
FIG. 3 is a front view of the assembly.

Referring to FIGS. 1-6, the assembly includes a power cable 10 having a first end 11 which is connectable to an electric power supply 1, and a second end 14 which is connectable to a vehicle 2 to supply electric power from the power supply 1 to the vehicle 2.

Figure 4:
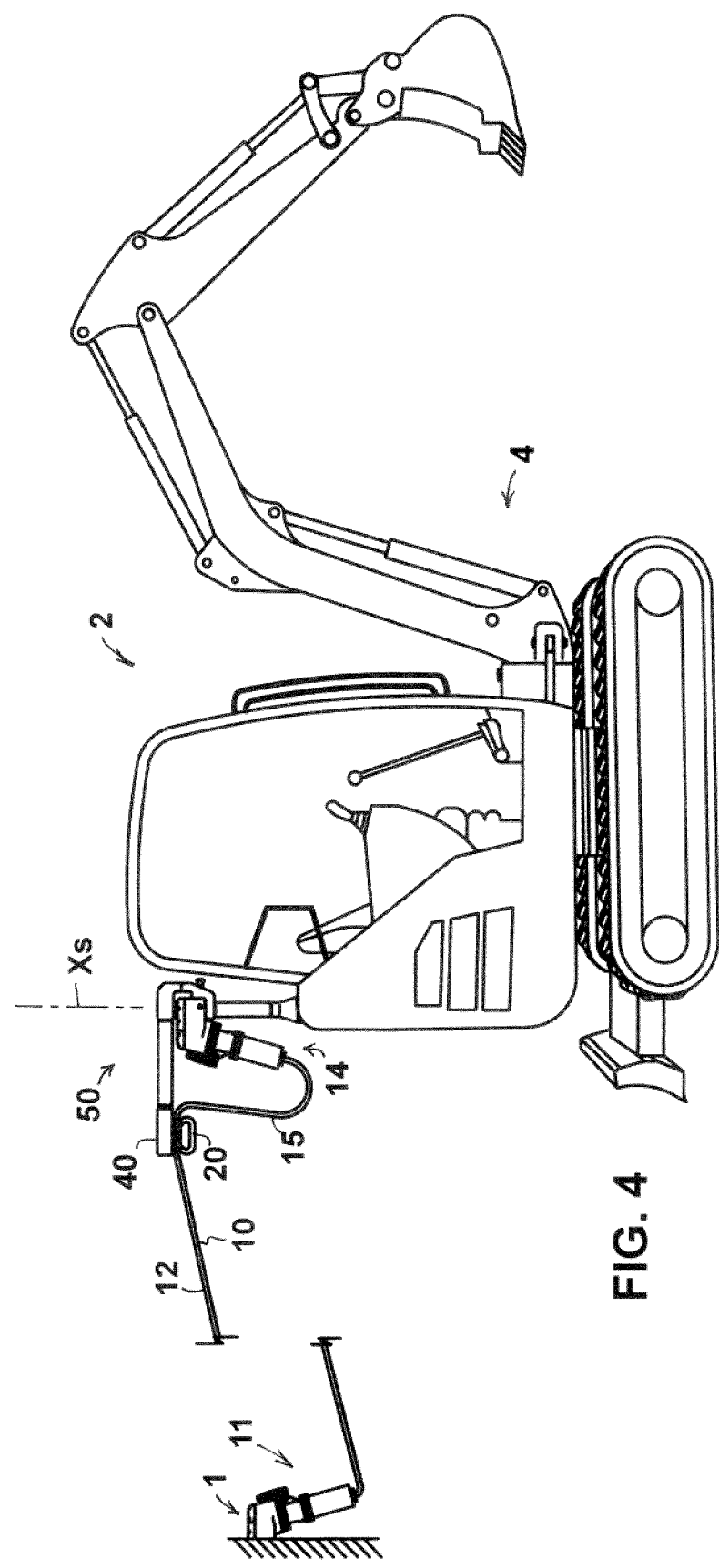
FIG. 4 shows the assembly mounted on an excavator with the cable in tension.
Figures 5, 6:
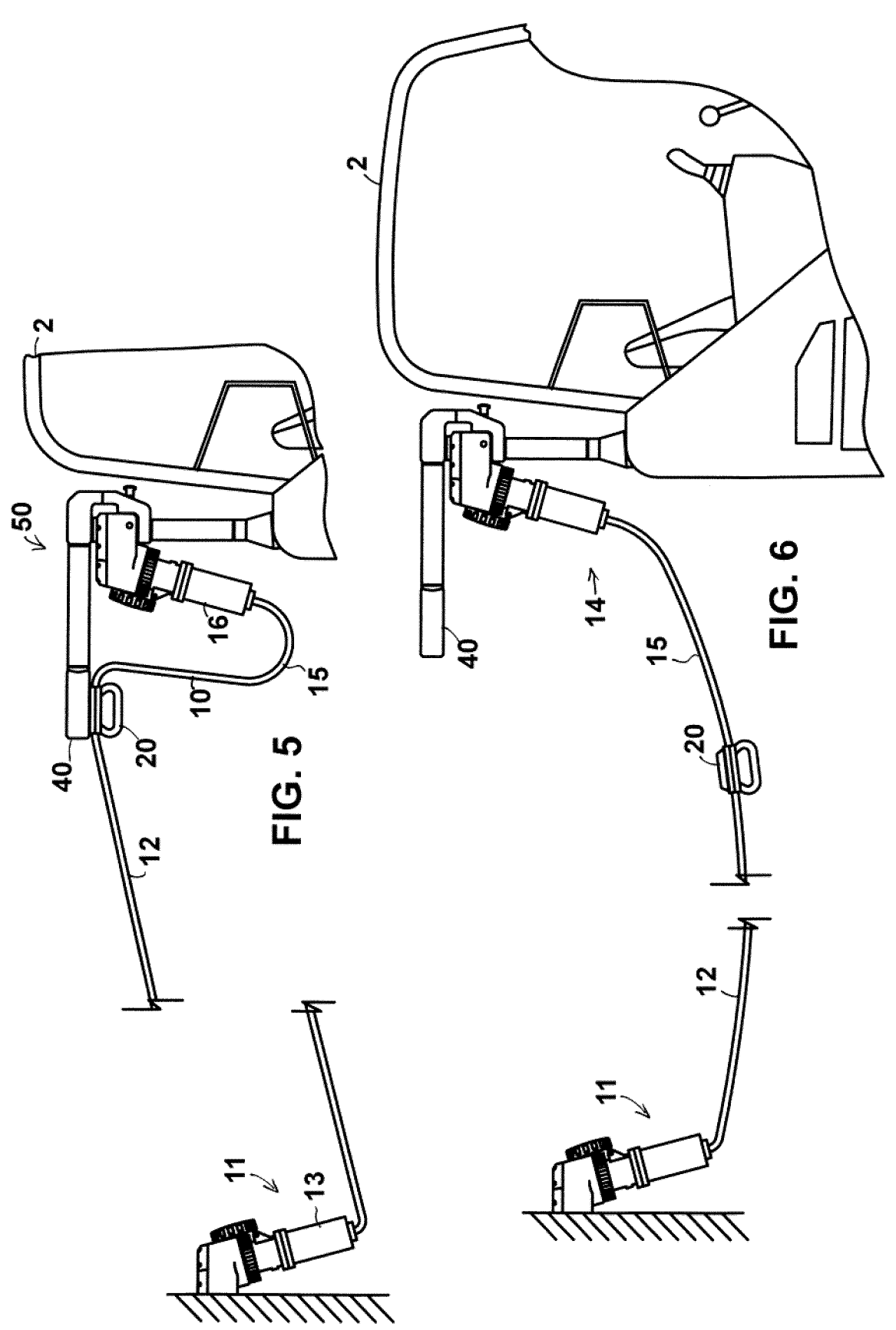
FIG. 5 is an enlarged view of the assembly as shown in FIG. 4, with the cable in tension.
FIG. 6 shows the assembly after detachment of the anchor from the mount.

The power supply 1 may be a fixed power supply, and the first end 11 of the cable or tether 10 may be provided with a plug 13 for connection to the fixed power supply 1, as shown in FIGS. 4-6. The power supply 1 may be, for example, a three-phase, 415V power supply. The second end 14 of the cable 10 may be provided with another electrical connector (e.g. a plug 16 as shown) for connection to a power intake socket 3 of the vehicle.

In the illustrated embodiment, the vehicle 2 is a work machine (work vehicle), which is to say, a vehicle that is equipped with a tool mounted on the vehicle and manipulable by the operator. The illustrated work vehicle is a small excavator, with a bucket mounted on a stick and boom, but the assembly could equally be used on other vehicles, including wheeled or tracked work vehicles.

An anchor 20 is connected to the cable 10 between its first and second ends 11, 14, to define a first portion 12 of the cable extending between the anchor 20 and the first end 11 of the cable, and a second portion 15 of the cable extending between the anchor 20 and the second end 14 of the cable. In this specification, the term "anchor" is used to mean a part that mechanically supports the cable.

The assembly further includes a disconnection switch 30 (shown in FIGS. 9, 10 and 11), which is operable to interrupt the supply of electric power from the cable 10 to the vehicle 2.

The disconnection switch 30 may be incorporated into the mount 40, as exemplified by the illustrated embodiment and further described below, and may be electrically connected in-between the second end 14 of the cable and the powered systems 4 of the vehicle 2, in which case it will carry the full power of the cable 10. Alternatively, the disconnection switch may be arranged to control a circuit breaker which is electrically connected in-between the second end 14 of the cable and the powered systems 4 of the vehicle, in which case it may only carry a small current to control the circuit breaker, as further described below.

Alternatively the disconnection switch could be incorporated into the anchor 20. In such arrangements (not shown) the disconnection switch could be electrically connected in-between the first and second portions 12, 15 of the cable 10 to carry the full power of the cable. Alternatively, it could be electrically connected (e.g. via a control cable running along the second portion 15 of the power cable 10) to a circuit breaker which is controlled by the disconnection switch and is electrically connected in-between the second end 14 of the cable and the powered systems 4 of the vehicle.

Figures 7, 8, 9:
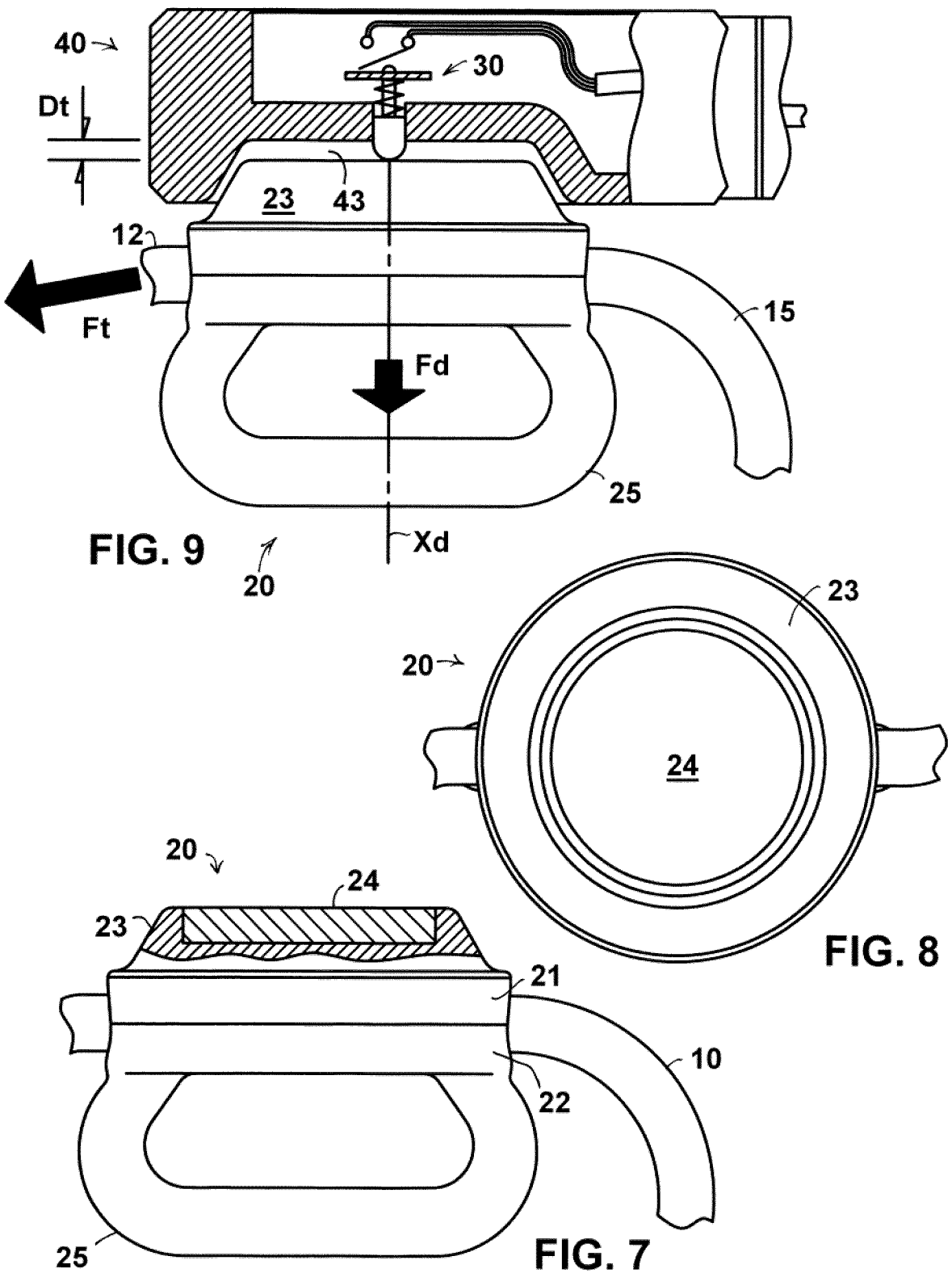
FIG. 7 is a side view of the anchor, partially cut away to show the magnet.
FIG. 8 is a top view of the anchor.
FIG. 9 shows the anchor during detachment from the mount.

The first and second portions 12, 15 of the cable 10 may be portions of a single, unbroken length of cable 10, in which case, the anchor 20 may be clamped onto the cable, e.g. by screwing together two parts 21, 22 of the anchor 20 as shown in FIG. 7 to secure the cable in-between them. Alternatively, the first and second portions 12, 15 of the cable 10 may be two separate lengths of the cable, of similar or different construction, which are electrically connected together at the anchor, optionally with the disconnection switch being electrically interposed between them.

The assembly further includes a mount 40, which is configured to be supported on the vehicle 2 in a use position, as shown in FIGS. 1 and 4 and in FIGS. 5 and 6.

Referring now to FIGS. 5 and 6, in the use position of the mount 40, when the second end 14 of the cable 10 is connected to the vehicle 2, the anchor 20 is attachable to the mount 40, and is also detachable from the mount 40 and re-attachable to the mount after detachment. When attached to the mount 40, the anchor 20 supports the cable 10 on the mount 40—which is to say, the cable 10 is supported by the anchor 20, and the anchor 20 is supported by the mount 40—with the second portion 15 of the cable in a slack condition, as shown in FIG. 5. The slack, second portion 15 of the cable may hang in a loop, as shown. The cable 10 may be suspended in use from the anchor 20.

The anchor 20 is detachable from the mount 40 by application of a threshold detachment force Fd by tension in the first portion 12 of the cable 10, without mechanically disconnecting the second end 14 of the cable from the vehicle 2. In this context, detachment of the anchor 20 means that the anchor is physically separated from the mount 40, i.e. moved away from the mount 40; after detachment, the anchor remains mechanically connected to the vehicle 2 by the second portion 15 of the cable.

Figures 10, 11:
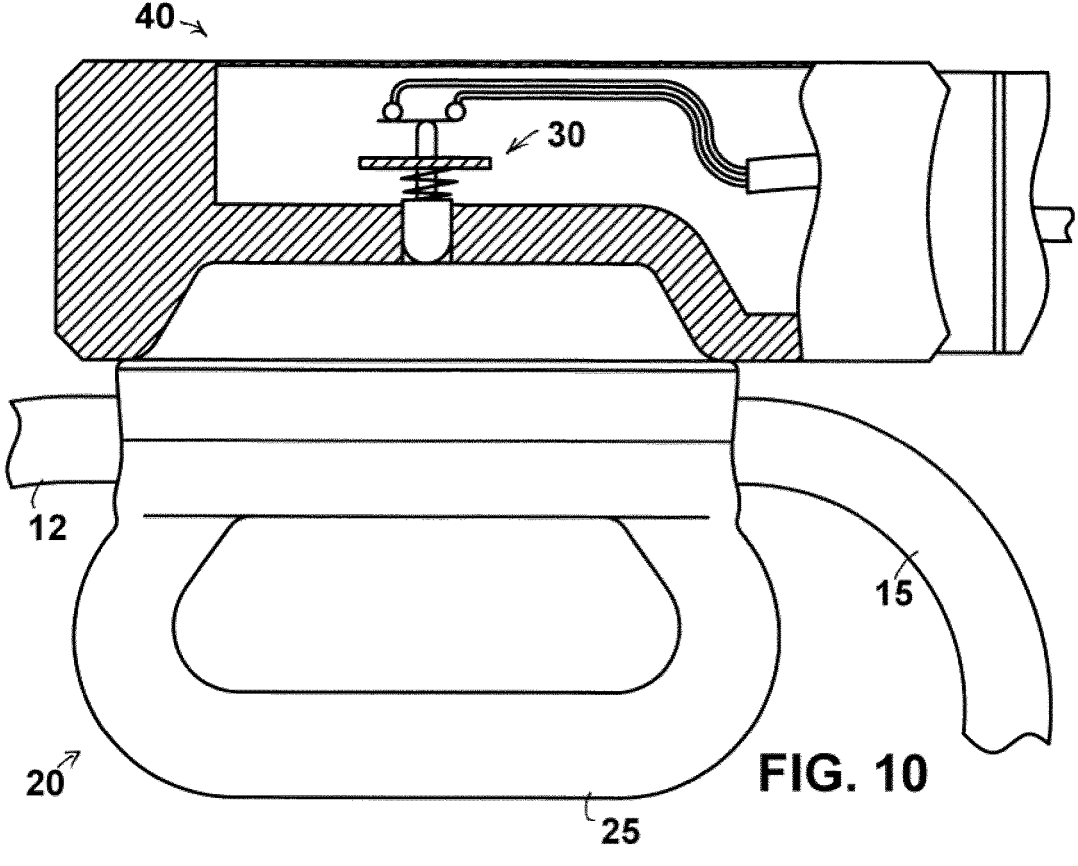
FIG. 10 shows the anchor attached to the mount.
FIG. 11 shows the mount after detachment of the anchor, together with a control system of the excavator.

Referring now to FIGS. 9-11, the disconnection switch 30 is operable, by detachment of the anchor 20 from the mount 40, to interrupt the supply of electric power from the cable 10 to the vehicle 2.

The disconnection switch 30 may be manually operable to re-establish the supply of electric power by re-attachment of the anchor 20 to the mount 40. Thus, the switch may re-establish the supply of power, only when the anchor 20 is replaced in its attached position on the mount 40.

The switch 30 may be a momentary switch, resiliently biased to a rest position, and may be operable by abutment against the anchor 20 as the anchor 20 moves from a detached position (FIG. 9) to an attached position (FIG. 10), as exemplified by the illustrated embodiment. In the example shown, the switch 30 is normally-open, but it could alternatively be normally-closed, depending on how the circuit is arranged.

Other switching arrangements are possible; for example, the switch could be any suitable switch or other sensor configured to interrupt the power supply (either directly or indirectly) and operable by contact or by proximity of the anchor, e.g. by a magnetic field of the anchor.

In the illustrated embodiment, the disconnection switch 30 is arranged to control a circuit breaker 31. The circuit breaker 31 is arranged electrically in-between the second end 14 of the cable 10 and the powered systems 4 of the vehicle 2 to interrupt the supply of power from the cable to the vehicle. The powered systems 4 of the vehicle may include, for example, one or more drive motors for driving the wheels or tracks to move the vehicle 2 over the ground, and/or one or more actuators for controlling the boom, stick, and/or bucket or other tool.

In order to prevent unintended motion of the vehicle 2 responsive to replacing the anchor on the mount, the vehicle may include a control system 32 including a reset control 33 which is operable by a user separately from the disconnection switch 30. The control system 32 is arranged to maintain the vehicle 2 in a disabled condition, after re-establishment of the supply of electric power, until a user input is received via the reset control 33. Once the user input is received, the control system 32 re-enables operation of the vehicle 2.

As shown in FIG. 11, the control system 32 may include an electronic control unit 34 that operates another circuit breaker 35 to interrupt the power supply, or may be any other, e.g. electrical or mechanical arrangement, effective to disable operation of the vehicle as generally known in the art.

In this way the control system 32 may be configured to maintain the vehicle 2 in an inactive condition responsive to power loss, and to require a reset command from the operator in order to restore the vehicle 2 to an active condition after power is restored.

Referring again to FIGS. 1-3, the assembly may include a support structure 50. The support structure 50 includes a swivel assembly 51 and an arm 52 supported on the swivel assembly 51. The swivel assembly 51 is configured to be supported on the vehicle 2, as shown in FIG. 4, and defines a swivel axis Xs acollinear with the arm 52 (which is to say, not collinear with the arm—i.e. the arm 52 extends laterally away from the swivel axis Xs). The mount 40 is supported in the use position at a distal end of the arm 52 and is pivotable about the swivel axis Xs by movement of the arm 52.

The arm 52 may be configured to be releasably locked in an outwardly extending position so as to hold the cable 10 clear of the vehicle 2, for example, by manual operation of a lock 53. The lock 53 may be configured to engage a static upright post 54 of the support structure while the arm 52 swivels around the post 54 on an internal joint, as shown. Conveniently, the arm 52 may be configured to support the cable in a coil on the arm when the vehicle is not in use.

The second end 14 of the cable 10 may be releasably coupled to a power connector, such as an intake socket 3 as shown, which is mounted on the support structure 50. Optionally, another mechanical support (not shown) may be provided at the second end 14 of the cable to relieve the power connection, e.g. plug 16 and intake socket 3, from tension in the second portion 15 of the cable when the anchor 20 is detached from the mount.

Referring to FIG. 9, the anchor 20 may be detachable from the mount 40 in its use position by movement of the anchor 20 along a detachment axis Xd of the mount. The anchor 20 and mount 40 may define co-operating abutment surfaces 23, 43 which are configured to convert a tension force Ft applied by the first portion 12 of the cable in a direction not aligned with the detachment axis Xd, to generate a force component (represented in FIG. 9 by the detachment force Fd) acting along the detachment axis Xd.

As shown in FIG. 1, the tension force Ft may be applied in different directions to the mount 40 (which reacts the tension force applied by the cable 10 to the anchor 20), depending on how the vehicle 2 moves over the ground relative to the fixed location of the power supply 1. In order to ensure reliable detachment when the cable is tensioned, irrespective of its orientation, the abutment surfaces 23, 43 may be configured to generate a force component (Fd) acting along the detachment axis Xd when the tension force Ft acts in a direction normal to the detachment axis Xd, illustrated by the uppermost position of the cable 10 as shown in broken lines in FIG. 1. The force component Fd may be generated by selecting a suitable contact angle between the abutment surfaces, relative to their coefficient of friction, to generate sliding or pivotal motion between them as known in the art. For this purpose the mount 40 may define a shallow, inwardly tapering recess which receives the anchor. The recess may be downwardly facing to further ensure reliable detachment, as further discussed below.

As illustrated in FIG. 2, the abutment surfaces 23, 43 may be configured to generate a force component (Fd) acting along the detachment axis Xd when the tension force Ft acts in either of two opposite directions normal to the detachment axis Xd, represented by the two opposite directions of the cable 10 as shown in broken lines in FIG. 2. This ensures detachment when the vehicle 2 is oriented anywhere in a wide angular range relative to the direction of the cable 10, and especially when the arm 52 is locked so that it cannot swivel.

As best seen in FIGS. 7-11, the co-operating abutment surfaces 23, 43 may be surfaces of rotation, e.g. frustoconical surfaces, to ensure reliable detachment under a tension force Ft applied through a wide angular range. A curved or radiused profile may alternatively be used.

The anchor 20 may be magnetically attachable to the mount 40, for example, by arranging a magnet 24 (or two or more magnets) in the anchor 20 to be attracted to a magnet-responsive material (e.g. another magnet, or an iron or steel body 44) in the mount 40. Alternatively the mount may include a magnet or magnets that attract the anchor. The magnets may be configured to exert an attraction force that declines rapidly with increasing distance between the anchor 20 and the mount 40, and so may define a relatively short threshold distance Dt (FIG. 9) as discussed below.

Alternatively, a mechanical catch (not shown) could be arranged to release the anchor at the threshold detachment force. For example, the catch could be urged into engagement with the anchor (or with the mount) by a resilient bias element, until it is released when the threshold detachment force overcomes the restoring force of the resilient bias element.

As exemplified by the illustrated embodiment, the anchor 20 may be attachable to a downwardly facing portion 45 of the mount 40 in its use position. The downwardly facing portion 45 of the mount may define a downwardly open recess 46, with the anchor 20 being received in the recess 46 when attached to the mount 40. The recess 46 helps to locate the anchor 20 on the mount. Alternatively, the anchor 20 could include a recess which receives a downwardly facing protuberance of the mount.

Further as exemplified by the illustrated embodiment, the anchor 20 may include a handgrip 25, which is arranged on a downwardly facing side of the anchor 20 when the anchor 20 is attached to the mount 40 in the use position of the mount, as shown in FIGS. 1 and 4. The anchor 20 may comprise a moulded body (e.g. of plastics or aluminium) on which the handgrip is integrally formed.

Referring to FIG. 9, the assembly may be arranged so that, in the downwardly facing, use position of the mount 40, when the anchor 20 is separated from the mount 40 by a threshold distance Dt along the detachment axis Xd of the mount, the anchor 20 is further separable from the mount by a net separating force (represented in FIG. 9 by the detachment force Fd) acting along the detachment axis Xd and equivalent to the self weight of the anchor 20 and the second portion 15 of the cable. The threshold distance Dt may be not more than 20 mm.

In addition, in the use position of the mount 40, when the anchor 20 is separated from the mount 40 by half of the threshold distance Dt along the detachment axis Xd, the anchor 20 and the mount 40 may co-operate to apply an attraction force to the anchor, acting along the detachment axis Xd and of a magnitude greater than said net separating force, to urge the anchor 20 towards the mount 40. The attraction force acts in the opposite direction to the detachment force Fd as shown in FIG. 9, and assists the user in re-attaching the anchor 20 against its own weight and the weight of the suspended cable 10.

For example, a magnet 24 or magnets may exert an attraction force to urge the anchor 20 into its mounted position as it approaches very close to the mount 40 at less than one half of the threshold distance Dt—for example, within the last 10 mm or 5 mm of movement. Alternatively, if the assembly includes instead of a magnet, a resilient (e.g. spring biased) catch mechanism (not shown) to retain the anchor to the mount, the catch may pass, reversibly, through a metastable or over-centre position as the anchor approaches very close to the mount, e.g. within the last 10 mm or 5 mm of movement, after which the bias spring acts on the catch to urge the anchor towards the mount.

Where the disconnection switch 30 is resiliently biased to the disconnected state (i.e. to the position in which it acts to interrupt the power supply), the attraction force may overcome the resilient bias to move the disconnection switch 30 to the connected state to re-establish the power supply, as shown in FIG. 10.

INDUSTRIAL APPLICABILITY

After detachment of the anchor 20 from the mount 40, the effective length of the cable 10 is immediately increased by the additional length provided by the slack, second portion 15 of the cable, as shown in FIG. 6. This immediately reduces tension in the cable 10, while accommodating a small range of further movement of the vehicle 2 as the vehicle comes to rest after power is lost, preventing damage to the cable.

After detachment, the anchor 20 remains mechanically connected to the vehicle 2 by the second portion 15 of the cable. This ensures that the second end 14 of the cable does not present an electrical hazard if the cable 10 remains live after disconnection, and further assists the operator to re-attach the anchor 20 to the mount 40.

The length of the slack, second portion 15 of the cable may be selected to increase the effective length of the cable 10 by an additional length greater than a maximum range of residual movement of the vehicle 2 as the vehicle comes to rest following a loss of power. The maximum residual movement may be greatest at a distal extremity of a work tool mounted on the vehicle, e.g. at the tip of the bucket.

Typically, it will be difficult for the user to replace the anchor 20 in its attached position without relieving tension in the cable 10. So, in order to replace the anchor 20, the operator must disentangle the cable 10 if it is entangled, or, if it is overextended but not entangled, must provide a longer cable 10.

The disconnection switch 30 may be configured to reset to the functional condition only when the anchor 20 is replaced in its attached position on the mount 40. Since it is difficult to replace the anchor 20 without sorting out the problem with the cable, this effectively precludes reconnection in an unsafe condition of the cable. For example, the switch 30 may be a momentary switch, as exemplified by the illustrated embodiment.

Moreover, since the operator is required to go to the anchor 20 to manually replace the anchor in its attached position, this prevents the operator from resetting the power supply to the vehicle 2 without a proper inspection of the cable 10 where it connects to the vehicle. The necessity of attending the anchor 20 to reset the system also discourages the operator from operating the machine close to the maximum stretched limit of the cable.

In combination, the automatic reset of the disconnection switch 30 and the inhibitory operation of the control system 32 provide a simple, two-step procedure to resume operation of the vehicle after the power supply is disconnected, while ensuring that the vehicle 2 cannot be re-started until the operator is ready to resume control.

The threshold distance Dt represents the inverse relationship between the force required to move the anchor 20 further away from the mount 40, and the distance of the anchor from the mount. The net separating force is the total force acting on the anchor along the detachment axis Xd. For example, if the detachment axis Xd is vertical as shown, and the anchor 20 together with the second portion 15 of the cable weighs 1 kg, then a net separating force of 1 kgf acting vertically downwardly will move the anchor 20 further away from the mount 40 when the anchor 20 is at or beyond the threshold distance Dt from the mount 40. The threshold distance Dt can be determined experimentally by removing the anchor 20 from the cable 10 and supporting the anchor 20, with a weight representing the mass of the second portion 15 of the cable, at the threshold distance from the mount 40 along the detachment axis Xd.

Of course, in use, the anchor 20 will also support the weight of the first portion 12 of the cable, which will vary depending on its suspended length and diameter, and so the net separating force and the attraction force (if provided) can be selected accordingly to suit the intended operating conditions of the vehicle 2. It is conceivable also that the net separating force and/or the attraction force may be adjustable to suit different operating conditions. This could be achieved for example in a magnetic coupling system by positioning an adjustable spacer, e.g. a shim set of variable thickness, between the anchor 20 and the mount 40, or in a system based on a spring catch mechanism, by adjusting the strength (e.g. compression) of the retaining spring that energises the catch that engages the anchor to retain the anchor to the mount.

It will be understood that a short threshold distance Dt means a more sudden, bistable action, and a reduced window for metastable operation—which is to say, it makes it more difficult for the user to operate the vehicle 2 with the cable 10 at maximum tension. As soon as the tension in the cable 10 rises to a level sufficient to apply the threshold detachment force Fd, the anchor 20 will detach suddenly and then fall away from the downwardly facing mount 40 under its own weight and the weight of the first and second portions of the cable 10.

In order to further accentuate this bistable action, the threshold distance may be reduced to less than 15 mm, less than 10 mm, or even less than 5 mm.

In order to further assist the user in re-attaching the anchor 20, the magnitude of the attraction force may be more than two times the net separating force, or even more the four times the net separating force.

In order to avoid nuisance operation when supporting a long and heavy cable 10, the threshold detachment force may at least five times the net separating force, optionally at least ten times the net separating force, or even at least fifteen times the net separating force.

For example, the threshold detachment force could be at least 5 kgf, at least 10 kgf, or even at least 15 kgf.

In summary, an electric vehicle 2 is supplied with power from a power supply 1 via a cable 10 supported by an anchor 20. The anchor 20 is attached to a mount 40 on the vehicle and detachable from the mount 40 by tension in a first portion 12 of the cable between the anchor 20 and the power supply 1. A second portion 15 of the cable between the anchor 20 and the vehicle 2 remains slack in the attached position of the anchor 20, and extends on detachment of the anchor to relieve tension in the first portion 12 of the cable 10. A disconnection switch 30 is operable by detachment of the anchor 20 to interrupt the power supply from the cable 10 to the vehicle 2.

In use, the vehicle 2 may be supplied with electric power by providing a power cable 10 and arranging a first end 11 of the cable to be connectable to an electric power supply 1, and a second end 14 of the cable to be connectable to the vehicle to supply electric power from the power supply 1 to the vehicle 2.

The method further includes arranging a disconnection switch 30 to be operable to interrupt the supply of electric power from the cable 10 to the vehicle 2, and connecting an anchor 20 to the cable between its first and second ends 11, 14, to define a first portion 12 of the cable extending between the anchor 20 and the first end 11 of the cable, and a second portion 15 of the cable extending between the anchor 20 and the second end 14 of the cable.

The method further includes supporting a mount 40 on the vehicle 2 in a use position, wherein the anchor 20 is detachably attachable and re-attachable to the mount 40, to support the cable 10 on the mount 40 with the second portion 15 of the cable in a slack condition.

The method further includes arranging the anchor 20 to be detachable from the mount 40 by application of a threshold detachment force Fd by tension in the first portion 12 of the cable, and arranging the disconnection switch 30 to be operable by detachment of the anchor 20 from the mount 40 to interrupt the supply of electric power from the cable 10 to the vehicle 2.

Many further adaptations are possible within the scope of the claims.

In the claims, reference numerals and characters are provided in parentheses, purely for ease of reference, and should not be construed as limiting features.

The invention claimed is:

1. An assembly for supplying power to a vehicle, the assembly including:

a power cable having a first end connectable to an electric power supply and a second end connectable to a vehicle to supply electric power from the power supply to the vehicle;

a disconnection switch operable to interrupt the supply of electric power from the cable to powered systems of the vehicle;

an anchor having a cable receiving portion and a mount engaging portion fixed thereto, the cable receiving portion connected to the cable between its first and second ends to define a first portion of the cable extending between the anchor and the first end of the cable and a second portion of the cable extending between the anchor and the second end of the cable; and a mount configured to be supported on the vehicle in a use position; wherein, in the use position of the mount, when the second end of the cable is connected to the vehicle, the mount engaging portion of the anchor is detachably attachable and re-attachable to the mount to support the cable on the mount with the second portion of the cable in a slack condition; and wherein the mount engaging portion of the anchor is detachable from the mount by application of a threshold detachment force by tension in the first portion of the cable that pulls on the cable receiving portion of the anchor fixed to the mount engaging portion; and the disconnection switch is operable by detachment of the mount engaging portion anchor from the mount to interrupt the supply of electric power from the cable to the powered systems of the vehicle.

2. The assembly according to claim 1, wherein the disconnection switch is operable to re-establish the supply of electric power by re-attachment of the mount engaging portion of the anchor to the mount.

3. The vehicle including the assembly according to claim 2, the mount being supported in the use position on the vehicle, the vehicle further including a control system, the control system including a reset control, the reset control being operable by a user separately from the disconnection switch;

the control system being arranged in use, after re-establishment of the supply of electric power, to maintain the vehicle in a disabled condition until a user input is received via the reset control.

4. The assembly according to claim 1, including a support structure, the support structure including a swivel assembly and an arm supported on the swivel assembly, the swivel assembly configured to be supported on the vehicle and defining a swivel axis acollinear with the arm; the mount being supported in the use position at a distal end of the arm and pivotable about the swivel axis by movement of the arm.

5. The assembly according to claim 1, wherein in the use position of the mount, the mount engaging portion of the anchor is detachable from the mount by movement of the anchor along a detachment axis of the mount; and the mount engaging portion of the anchor and mount define co-operating abutment surfaces configured to convert a tension force applied by the first portion of the cable in a direction not aligned with the detachment axis, to generate a force component acting along the detachment axis.

6. The assembly according to claim 1, wherein the mount engaging portion of the anchor is magnetically attachable to the mount.

7. The assembly according to claim 1, wherein in the use position of the mount, the anchor is attachable to a downwardly facing portion of the mount.

8. The assembly according to claim 7, wherein the downwardly facing portion of the mount defines a downwardly open recess, and the mount engaging portion of the anchor is received in the recess when attached to the mount.

9. The vehicle including the assembly according to claim 1, wherein the second end of the cable is connected to the vehicle and the mount is supported on the vehicle in the use position.

10. A method of supplying electric power to a vehicle, the method including:

providing a power cable;

arranging a first end of the cable to be connectable to an electric power supply and a second end of the cable to be connectable to the vehicle to supply electric power from the power supply to the vehicle;

arranging a disconnection switch to be operable to interrupt the supply of electric power from the cable to powered systems of the vehicle;

connecting a cable receiving portion of an anchor to the cable between its first and second ends to define a first portion of the cable extending between the anchor and the first end of the cable and a second portion of the cable extending between the anchor and the second end of the cable, the anchor having a mount engaging portion fixed to the cable receiving portion; and supporting a mount on the vehicle in a use position, wherein the mount engaging portion of the anchor is detachably attachable to the mount, and re-attachable to the mount after detachment from the mount, to support the cable on the mount with the second portion of the cable in a slack condition; and further including:

arranging the mount engaging portion of the anchor to be detachable from the mount by application of a threshold detachment force by tension in the first portion of the cable that pulls on the cable receiving portion of the anchor fixed to the mount engaging portion; and arranging the disconnection switch to be operable to interrupt the supply of electric power by detachment of the mount engaging portion anchor from the mount.

* * * * *